United States Patent
Borza et al.

(10) Patent No.: US 11,477,286 B2
(45) Date of Patent: Oct. 18, 2022

(54) COMBINED LOCAL AND SERVER CONTEXT MENUS

(71) Applicant: Microsoft Technology Licensing, LLC, Redmond, WA (US)

(72) Inventors: Paul Valentin Borza, Seattle, WA (US); Dan Wu, Bothell, WA (US); Xiao Wang, Bellevue, WA (US); Jonathan Drew Pio, Seattle, WA (US); Maryam Ummi Yusuf, Everett, WA (US); Jared Brown, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 15 days.

(21) Appl. No.: 16/864,597

(22) Filed: May 1, 2020

(65) Prior Publication Data

US 2021/0344779 A1 Nov. 4, 2021

(51) Int. Cl.
*H04L 67/131* (2022.01)
*G06F 9/451* (2018.01)
*H04L 67/01* (2022.01)

(52) U.S. Cl.
CPC ............ *H04L 67/131* (2022.05); *G06F 9/451* (2018.02); *H04L 67/01* (2022.05)

(58) Field of Classification Search
CPC .......... H04L 67/38; H04L 67/42; G06F 9/451
USPC ................................................. 709/203, 206
See application file for complete search history.

(56) References Cited

U.S. PATENT DOCUMENTS

| | | | |
|---|---|---|---|
| 6,857,022 B1 | 2/2005 | Scanlan | |
| 6,999,916 B2 | 2/2006 | Lin et al. | |
| 9,582,580 B2 | 2/2017 | Lisa et al. | |
| 9,619,582 B1* | 4/2017 | Djabarov | G06F 16/285 |
| 2001/0049688 A1* | 12/2001 | Fratkina | G06F 16/954 |
| 2005/0039141 A1 | 2/2005 | Burke et al. | |
| 2006/0242590 A1 | 10/2006 | Polivy et al. | |
| 2007/0208813 A1 | 9/2007 | Blagsvedt et al. | |
| 2008/0021886 A1 | 1/2008 | Wang-Aryattanwanich et al. | |
| 2012/0137233 A1 | 5/2012 | Lewontin | |

(Continued)

OTHER PUBLICATIONS

"International Search Report and Written Opinion Issued in PCT Application No. PCT/US21/023548", dated Jun. 17, 2021, 17 Pages.

(Continued)

*Primary Examiner* — David R Lazaro
*Assistant Examiner* — Mariegeorges A Henry
(74) *Attorney, Agent, or Firm* — Calfee, Halter & Griswold LLP

(57) ABSTRACT

Embodiments of the disclosure render a context menu upon receiving a context menu indication from a user. The context menu comprises a combination of local context menu items and remote context menu items that are selected based on the context received with the context menu indication. The context menu is created by identifying a set of local and remote context menu item providers and receiving both a rank and HTML based on the received context. The set of local and remote context menu items are ranked according to their respective rank and a number of ranked context menu items are selected. The HTML for the selected context menu items are combined and the combined HTML is rendered to yield the context menu. The context menu is presented to the user.

20 Claims, 8 Drawing Sheets

(56) References Cited

U.S. PATENT DOCUMENTS

| | | |
|---|---|---|
| 2013/0067339 A1 | 3/2013 | Appelman et al. |
| 2013/0086056 A1* | 4/2013 | Dyor .................. G06F 3/167 707/730 |
| 2013/0104028 A1 | 4/2013 | Murray et al. |
| 2014/0325000 A1* | 10/2014 | Lorch ............. H04M 1/72436 709/206 |
| 2016/0188181 A1 | 6/2016 | Smith |
| 2018/0121036 A1 | 5/2018 | Moore et al. |
| 2018/0188924 A1* | 7/2018 | Kumar .................. G06N 5/04 |
| 2019/0384460 A1 | 12/2019 | Harnisch et al. |

OTHER PUBLICATIONS

"Quickly translate a word or a sentence on the website in browser. Google Translate extension for Chrome", Retrieved from: https://tunecomp.net/quickly-translate-a-word-or-a-sentence-on-the-website-in-browser-google-translate-extension-for-chrome/, Sep. 6, 2016, 13 Pages.

"Web Page & Text Translation", Retrieved from: https://web.archive.org/web/20190518114606/https:/www.slimjet.com/en/translation.php, May 18, 2019, 4 Pages.

* cited by examiner

COMBINED LOCAL AND SERVER CONTEXT MENUS

FIELD

This application relates generally to context menu functionality. More specifically, this application relates to context menus that combine local context menu providers and remote context menu providers into a single context menu.

BACKGROUND

Context menus are a way to provide focused options for a user to select from. A typical context menu is invoked by selecting an object (text, drawing object, and so forth) and invoking the context menu through an action such as a right click, long press, or other context menu invocation action.

It is within this context that the present embodiments arise.

DETAILED DESCRIPTION

Figure 1:
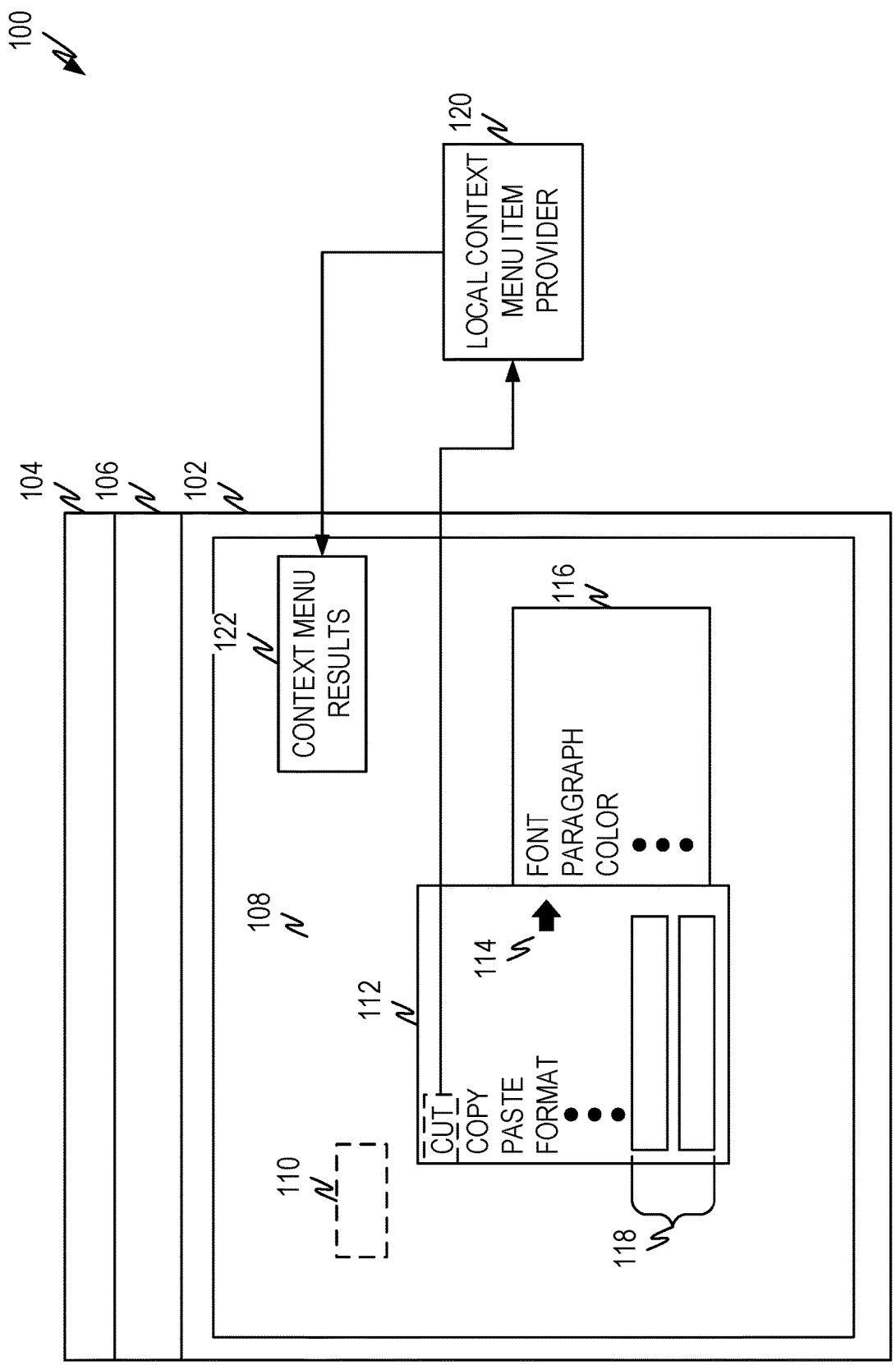
FIG. 1 illustrates an example of context menus that combine local functionality with remote functionality according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Context menus have not changed much since the earliest use of them in user interfaces. A context menu presents a focused set of items that allow a user to select operations that are particularly relevant to a particular selected item and context. For example, if a user selects a word in a document and invokes the context menu, common functions that are presented may include functions to operate directly on the word such as cut, paste, copy, and format. In some instances, selecting one context menu item, will reveal additional context menu options. Thus, selecting format from a context menu may reveal specific formatting commands, such as an option to change the font, change the font size, format the word in bold, and other such specific formatting options.

A context menu item is typically invoked by selecting one or more objects in a document and then executing the context menu invocation action such as a right click on a mouse, hovering over a word, a long press on a touch screen, and so forth. Upon receiving the invocation action, the system will render a context menu.

Unlike prior context menus, embodiments of the present disclosure present context menus that are unique in one of several ways. For example, in some embodiments, the context menu can comprise a combination of local context menu items and remote context menu items. Local context menu items are implemented using functionality that is implemented wholly or predominately locally. Thus, if a context menu includes a "cut" option, the functionality to implement the cut option resides locally and the functions of the application and/or operating system are called to implement the cut operation, which typically comprises removing the selected item from the document and placing the item on a clipboard or other location from which it can later be accessed, such as by a paste option.

Remote context menu items are implemented in whole or in part remotely. For example, search engines provide a variety of functions that extend beyond the simple providing of a list of search results in response to a query. For example, search engines can typically translate text from one language to another, provide direct answers to questions such as "how tall was George Washington?," and many other such functions. Thus, these functions can be used to expand the options available in a context menu by taking advantage of the remote functionality.

While the line between local context menu items and remote context menu items can sometimes blur, in the context of this disclosure, local context menu items or local context menu item providers are those menu items or providers that are implemented mostly or completely using local functionality, such as using functionality provided by the application and/or operating system. Remote context menu items or remote context menu item providers, on the other hand, are those menu items or providers that are implemented mostly or completely by one or more remote services, such as using functionality provided by a service to fact check a phrase, provide an answer to a direct question, and so forth.

Remote context menu items can have functionality that is provided remotely but is cached locally. For example, suppose a remote context item provider performs translation from one language to another. The remote context item provider and/or data may be cached locally so that when invoked, the remote context item provider need not access a network connection to provide the desired functionality. In the case of cached context menu item providers, they do not suddenly change characteristics and become local context menu item providers simply because the functionality and/or data was cached locally. In the case of cached functionality and/or data, the remote context menu item provider retains its designation as a remote context menu item provider.

Embodiments of the present disclosure gather local context menu providers and remote context menu providers that are relevant to the context and/or selected items and rank the local and remote context providers. The rank is used to select, and in some embodiments order, the context menu items that are presented to the user.

In some embodiments, the context menu providers return the rank used to select and/or order the context menu items that are presented to the user. The rank indicates the relevance that the functionality provided by that context menu provider has to the context and/or selected items.

In some embodiments, context menu providers return HTML or other rendering code that can be rendered in a compact view, referred to herein as a WebView. In the context of this disclosure, rendering code means any code or format that can be rendered into visual and/or functional aspects. In this disclosure, HTML will be used as an example, but any other rendering code can also be used. Since HTML allows for rich formatting and presentation of rich content, context menus can present rich content in unique ways. In the context of this disclosure, rich formatting means formatting beyond the simple presentation of text and rich content is content beyond text such as graphic content, video content, dynamic content, and so forth.

HTML or other rendering code from selected context menu item providers can be combined and the resultant combined HTML/rendering code used to render the context menu to the user. The combined HTML can also include functionality to initiate calls to the appropriate context menu item provider when a user selects the corresponding context menu item.

These and other aspects are explained more fully below.

DESCRIPTION

FIG. 1 illustrates an example of context menus, shown generally as 100, that combine local functionality with remote functionality according to some aspects of the present disclosure. An application 102 typically has several areas where content, and menu items and/or controls to access application functionality are presented. For example, application 102 can comprise a header region 104 where information such as the name of the document currently displayed can be presented along with controls to manipulate the application 102. An area 106 can comprise menus, a ribbon containing controls, and so forth. The menu items in the menus and controls in the ribbon can allow the user to access functionality presented.

A final area 108 can present the currently displayed document, such as a text document, drawing document, and/or other type of document. The displayed document typically comprises one or more items. Thus, an office productivity document may comprise text, tables, figures, and other items. Applications 102 comprise the ability to display context menus. Context menus present the user with a few options that are most likely to be of use to the user given the context in which the context menu was invoked.

A context menu 112 is typically invoked using a particular action, gesture, keystroke combination, and so forth. For example, common actions comprise a right click for systems that utilize a mouse, hovering over a word, or a long press for systems that have touch screens. Sometimes a context menu 112 has associated text 110 that has been selected when the action is performed.

When the context menu action is performed, the system captures a set of data, referred to herein as context data or more simply context. The context data can comprise any data that defines the context in which the action was performed. For example, if text and/or other entity in the document has been selected, the context can comprise the selected entities. Additionally, or alternatively, the location in the document, actions performed prior to the context action being performed, and/or any other data can be captured as part of the context data.

The context menu 112 comprises one or more context menu items. For example, the context menu 112 is illustrated as comprising the items of cut, copy, paste, format, and items 118. Each context menu items can be implemented by a context menu item provider (discussed below). Thus, when a user selects a context menu item for execution, the context data can be passed to the context menu item provider, which implements the corresponding function.

Context menu items and corresponding menu item providers can be either local context menu items/providers or remote context menu items/providers. Local context menu items are implemented using functionality that is implemented wholly or predominately locally. Thus, if a context menu includes a "cut" option, the functionality to implement the cut option resides locally and the functions of the application and/or operating system are called to implement the cut operation, which typically comprises removing the selected item from the document and placing the item on a clipboard or other location from which it can later be accessed, such as by a paste option.

Remote context menu items are implemented in whole or in part remotely. For example, search engines provide a variety of functions that extend beyond the simple providing of a list of search results in response to a query. For example, search engines can typically translate text from one language to another, provide direct answers to questions such as "how tall was George Washington?," and many other such functions. Thus, these functions can be used to expand the options available in a context menu by taking advantage of the remote functionality.

While the line between local context menu items and remote context menu items can sometimes blur, in the context of this disclosure, local context menu items or local context menu item providers are those menu items or providers that are implemented mostly or completely using local functionality, such as using functionality provided by the application and/or operating system. Remote context menu items or remote context menu item providers, on the other hand, are those menu items or providers that are implemented mostly or completely by one or more remote services, such as using functionality provided by a service to fact check a phrase, provide an answer to a direct question, and so forth.

Remote context menu items can have functionality that is provided remotely but is cached locally. For example, suppose a remote context item provider performs translation from one language to another. The remote context item provider and/or data may be cached locally so that when invoked, the remote context item provider need not access a network connection to provide the desired functionality. In the case of cached context menu item providers, they do not suddenly change characteristics and become local context menu item providers simply because the functionality and/or data was cached locally. In the case of cached functionality and/or data, the remote context menu item provider retains its designation as a remote context menu item provider.

In the example context menu 112, the items (and corresponding functions) of cut, copy, paste, and format are local context menu items while the context menu items 118 are remote context menu items.

Some context menu items, whether they are local or remote, can produce additional context menu items when selected. For example, the arrow associated with the format menu item in context menu 112 indicates that when activated, the context menu item may open another menu, such as context menu 116 showing the items of font, paragraph, color, and so forth. Furthermore, when an item on the further context menu (such as context menu 116) is selected, yet another menu, side panel, and so forth can be opened.

When a user selects a local context menu item, the associated local context menu item provider is called to implement the corresponding function(s). As noted, the context menu item provider and the resulting functions will be predominately local in the case of a local context menu item. Thus, selecting cut as shown in FIG. 1, results in the corresponding local context menu item provider 120 removing a selected entity 110 from the displayed document and placing the selected entity 110 onto a clipboard for later access. These actions are simply illustrated as the context menu results 122.

Figure 2:
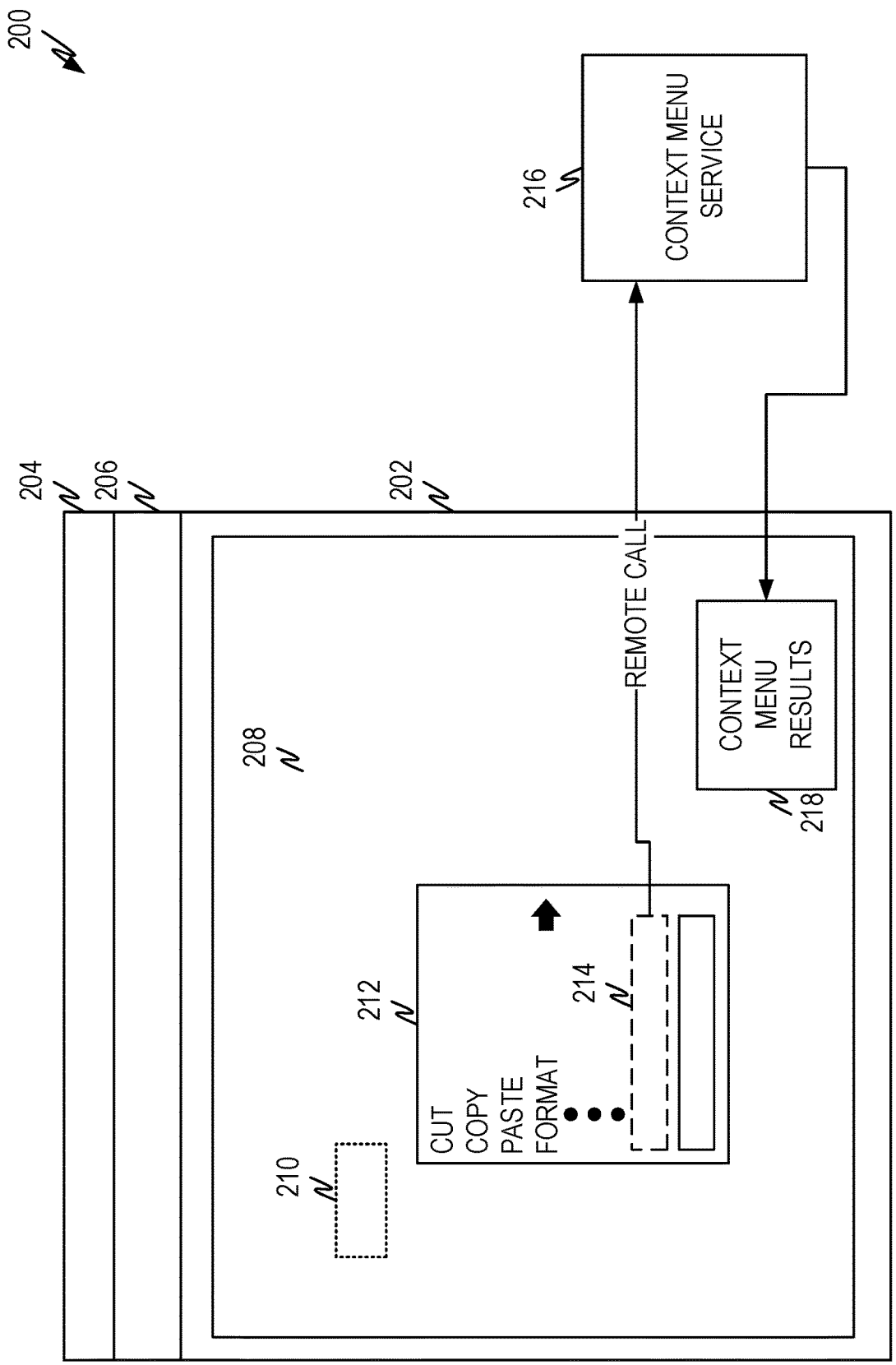
FIG. 2 illustrates an example of context menus that combine local functionality with remote functionality according to some aspects of the present disclosure.

FIG. 2 illustrates an example of context menus, shown generally as 200, that combine local functionality with remote functionality according to some aspects of the present disclosure. The focus of this figure is the remote context menu items. The remaining elements, numbered the same as in FIG. 1, are as described in conjunction with FIG. 1.

The context menu 112 can not only contain local context menu items, such as those described in conjunction with FIG. 1, but also contain remote context items such as remote context menu items 118 illustrated in FIG. 1. When a remote context menu item 214 is selected by the user, the associated remote context menu item provider is called to implement the corresponding function(s). Thus, where the associated remote context menu item provider resides on a context menu service 216, a remote call is made to the context menu service 216 to invoke the corresponding remote context menu item provider. These remote calls can be any type of remote call that allows the client application 102 to access the remote context menu item provider. When the remote context menu service 216 receives the remote call, it invokes the corresponding remote context menu item provider, which performs the corresponding functions.

Examples of remote context menu items/providers include, but are not limited, a context menu item provider adapted to translate text from one language to another, a context menu item adapted to provide a definition of text, a context menu item adapted to apply photo effects to an image, a context menu item adapted to identify related entities, a context menu item adapted to provide a direct answer, and/or a context menu item adapted to fact check text. These various context menu items/providers should be self-explanatory and need not be discussed further. Methods for each of these capabilities are known, and any of the methods can be used to implement the corresponding functionality. In some instances, machine learning models trained according to various machine learning techniques are used. In others, more deterministic logic can be used. In still others, a combination thereof can be used. Basically, any functionality that can be added to the context menu service 216 via an appropriate context menu item provider can be invoked via a remote context menu item. In one example, the context menu service is a search service such as BING® or GOOGLE®.

The results of invoking the remote context menu item 214 are illustrated as results 218 in FIG. 2.

Figure 3:
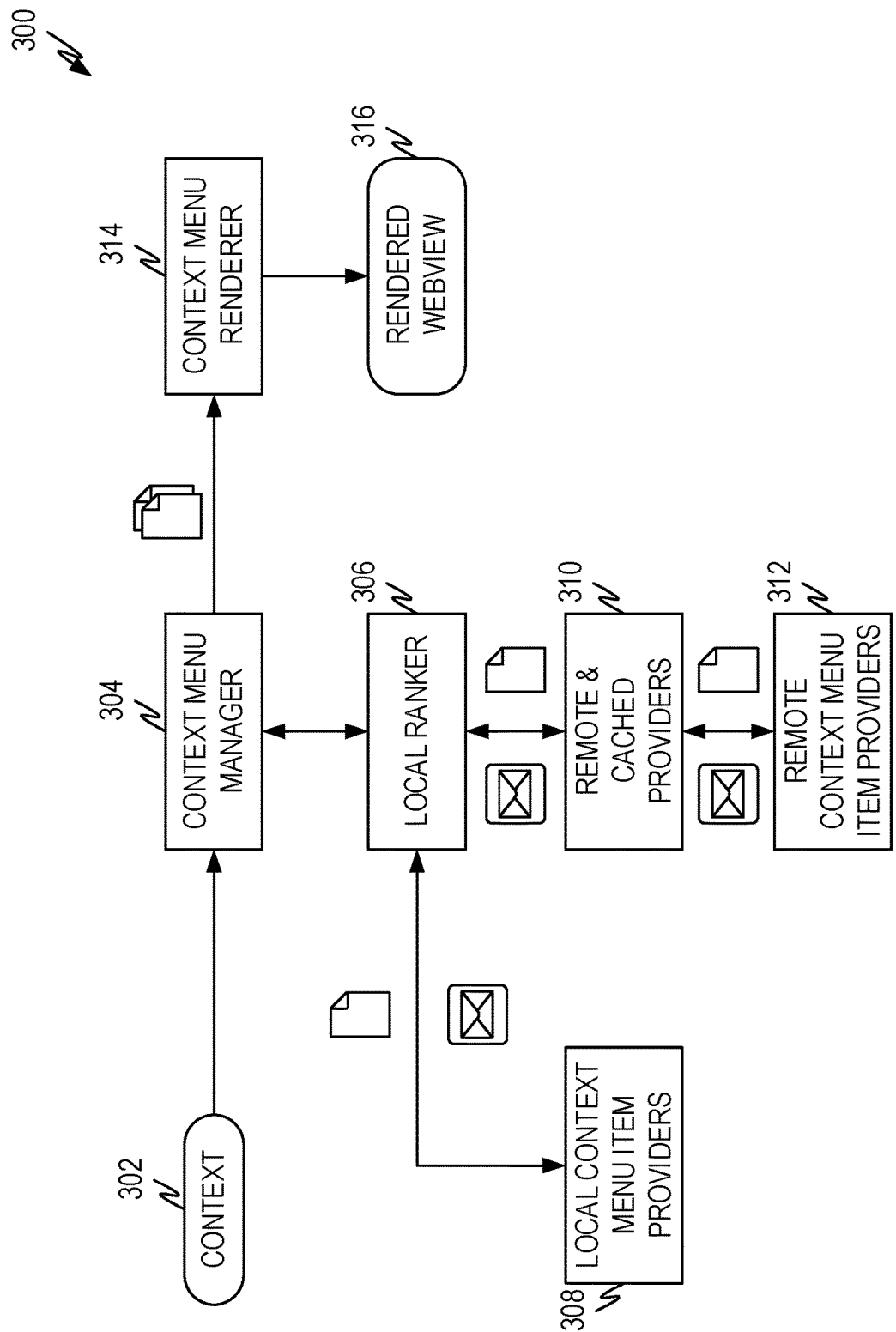
FIG. 3 illustrates an architecture diagram according to some aspects of the present disclosure.

FIG. 3 illustrates an architecture diagram, shown generally as 300, according to some aspects of the present disclosure. This architecture diagram illustrates an example architecture to build a context menu such as context menu 112 and/or context menu 116.

When a context menu is invoked, such as by a user performing a context menu action, the system captures a set of data, referred to herein as context data 302 or more simply context. The context data 302 can comprise any data that defines the context in which the action was performed. For example, if text and/or other entity in the document has been selected, the context can comprise the selected entities. Additionally, or alternatively, if the user hovers over a word or object, the system can interpret that as the word or object being selected and a context menu invoked. Additionally, or alternatively, the location in the document, actions performed prior to the context action being performed, and/or any other data can be captured as part of the context data.

The context data 302 is provided to a context menu manager 304. The context menu manager 304 handles communications between the local ranker 306 and the context menu renderer 314. As part of this, the context menu manager 304 provides the context data 302 to local ranker 306, or local ranker 306 can access the context data 302 at a location and/or in a manner specified by the context menu manager 304 to the local ranker 306.

The local ranker 306 knows the local and remote context menu item providers that are available, such as through information identified in a discovery process described below, and determines a subset (e.g., all or less than all) of the local context menu item providers and/or the remote context menu item providers. In some embodiments, all known context menu item providers are selected as the subset. In other embodiments, the subset is selected based on category and/or other information associated with a context menu item provider. For example, context menu item providers can identify which type of object they are designed to handle as part of a discovery process. The local ranker 306 can select all context menu item providers that deal with an object type specified by the context data 302 as the subset. The resultant subset can comprise local context menu item providers and/or remote context menu item providers in any combination.

The local ranker 306 sends a request to each local context menu item provider 308 and/or each remote context menu item provider 312 in the subset. In some embodiments, the request can contain some or all of the context data 302. The requests are illustrated by the envelopes in FIG. 3.

In response, the context menu item providers evaluate the information in the request and send back a rank that will be used by the local ranker 306 to compare against the ranks provided by other context menu item providers in order to determine the relevance that the functionality provided by the context menu item provider has to the context data 302. Thus, in the context of this disclosure, the rank returned by context menu item providers can be any measure or score that specifies a degree of relevance that the menu item provided by the context menu item provider has to the context data 302. The degree of relevance can be based on any scale and can be quantized to any desired level. Thus, a rank can be a value that lies on an X to Y scale or can be a binary value such as relevant or not relevant, or any value on any other scale.

In some embodiments, the context menu item providers also return HTML or other rendering code that allows rendering of the context menu item and provides a mechanism to access the functionality that implements the context menu item. For example, the HTML can provide a way to visually render a control so the user can identify and/or visualize the functionality provided by the menu item and can provide a mechanism to respond to a user's selection of the menu item and access the functionality corresponding to the menu item. The rank and/or code is illustrated in FIG. 3 by the document icons.

As described herein, remote context menu item providers can be cached locally in some instances so that their functionality can be accessed without a connection back to the context menu service. Thus, remote and cached providers 310 illustrate that the local ranker 306 communicates with the remote context menu item providers, whether they be remote or cached locally. In some embodiments, if a connection to the context menu service is unavailable, such as where the device where the application is executing is offline or where a network connection is unavailable, the local ranker 306 may skip attempting to contact remote context menu item providers that are not cached locally, or that are otherwise unreachable for the moment. In this situation, only locally cached remote context menu item providers will be considered for inclusion in the context menu being created.

In other embodiments, the local ranker 306 may rely on information that has been previously received to rank remote context menu items that are unavailable. For example, if the discovery process (described below) results in information that allows the local ranker to identify the types of objects (e.g., text, images, photos, graphic elements, tables, and so forth), a rank can be assigned to remote context menu providers based on an evaluation of that data in light of the context data 302. Such an approach could also be applied to cached remote context menu item providers and local context menu item providers as well. In other words, in some embodiments local ranker 306 can determine a rank for a context menu item provider based on information from the context menu item provider, such as might be supplied by the discovery process or supplied by the context menu item provider, prior to invocation of the context menu by the user performing the context menu item action.

The local ranker considers the ranks returned by the remote context menu item providers and/or local context menu item providers and, based on the rank, selects a number of context menu items to be included in the context menu. Since each context menu item provider returns a rank, indicating the relevance of the corresponding context menu item provider to the context data 302, a comparison of the ranks can allow a list of context menu items to be ordered by relevance.

There are numerous ways that the context menu items can be selected based on the rank. Some examples include, but are not limited to:
 Place the ranks in rank order and select the top N providers, where N is selected either based on a fixed number (e.g., less than or equal to the fixed number), is selected based on the area available to display the context menu, and/or any combinations thereof.
 Place local context menu item providers in rank order and place remote context menu item providers in rank order. Then select I local menu item providers from the local list and J remote item providers from the remote list. I and J can be selected based on a fixed number where I and J are separate fixed numbers that I and J cannot exceed, can be selected based on a total number (e.g., I+J<=M, with the total selected on the strategies of selecting N), can be selected based on the area available to display the context menu, and/or any combination thereof.

Any other desired strategy to select a number of context menu item providers from the subset.

Once the local ranker 306 selects a number of context menu items to be displayed in the context menu, the corresponding rendering code is sent to the context menu renderer 314. The context menu renderer 314 can either accept the combined rendering code (e.g., the rendering code is combined prior to being sent to the context menu renderer 314) or the individual rendering code for each context menu item that will appear in the context menu. In this latter case, the function of rendering code combination is performed by the context menu renderer 314.

Context menu renderer 314 then renders the context menu having the context menu items in order to produce the rendered context menu 316. Because the context menu is rendered rendering code, the context menu can be referred to as a rendered webview.

In some embodiments, the order of the context menu items in the rendered context menu is based on the rank of the corresponding context menu items. In such an embodiment, a remote context menu item might be placed at the top of the context menu while a local context menu item might be placed at the bottom of the context menu. Thus, ordering is dynamic and may be different each time a context menu is invoked.

The rendered context menu 316 contains not only visual aspects but also aspects that allow the functionality corresponding to each context menu item in the context menu 316 to be accessed.

In some embodiments, actions can be taken in lieu of, or in additional to, presenting a context menu. For example, when a user hovers over or selects a word, phrase, or other object, the execution can proceed as described above, with the context data 302 being captured, the context menu manager 304 functioning as described, the local ranker 306 identifying local context menu item providers and remote context menu item providers, and ranking the context menu item providers as described above.

At this point, the local ranker 306 and/or context menu manager 304 can automatically invoke the highest (or few highest) ranked context menu item providers to perform their provided functions. For example, if a user has selected a Latin phrase within a document and the local ranker determines that the highest ranked context menu item provider translates the Latin phrase to the current language of the document, the local ranker 306 and/or the context menu manager 304 can invoke the context menu item provider and receive as a result rendering code to display the translated Latin phrase.

The context menu manager 304 can then provide the rendering code for the result to the context menu renderer 314, which can then render the result along with, or in lieu of, the context menu. In this way, the system can predict what the user is likely to do and perform the action prior to the user actually selecting the action to be performed.

As a variation of the above, the system can invoke the context menu item provider based on the ranking combined with user preferences learned from observing user interactions with the document. For example, frequently accessed commands that are also highly ranked can be automatically invoked while less frequently access commands that are also highly ranked will not be invoked. Other combinations of rank and one or more other characteristics can be used in combinatorial logic to determine whether to invoke a particular context menu item provider prior to the user selecting the corresponding context menu item. For example, a rank, an expected time to receive results from the context menu item provider, and past user behavior can be used to invoke one or more context menu item providers. In this scenario, some combination of a higher rank, a longer expected turn around time, and a likelihood of invocation by the user can be used to decide to invoke the context menu item provider.

As another variation, the system can invoke the context menu item provider but hold off displaying the results. The results can be displayed based on the user selecting the appropriate context menu command. That way, the results can be "pre-fetched" and any remote call time can be eliminated.

Although particular functionality has been illustrated and described as being performed by certain components, the functionality can be partitioned differently with some aspects being shifted from one component to another or where some components can be combined.

Figure 4:
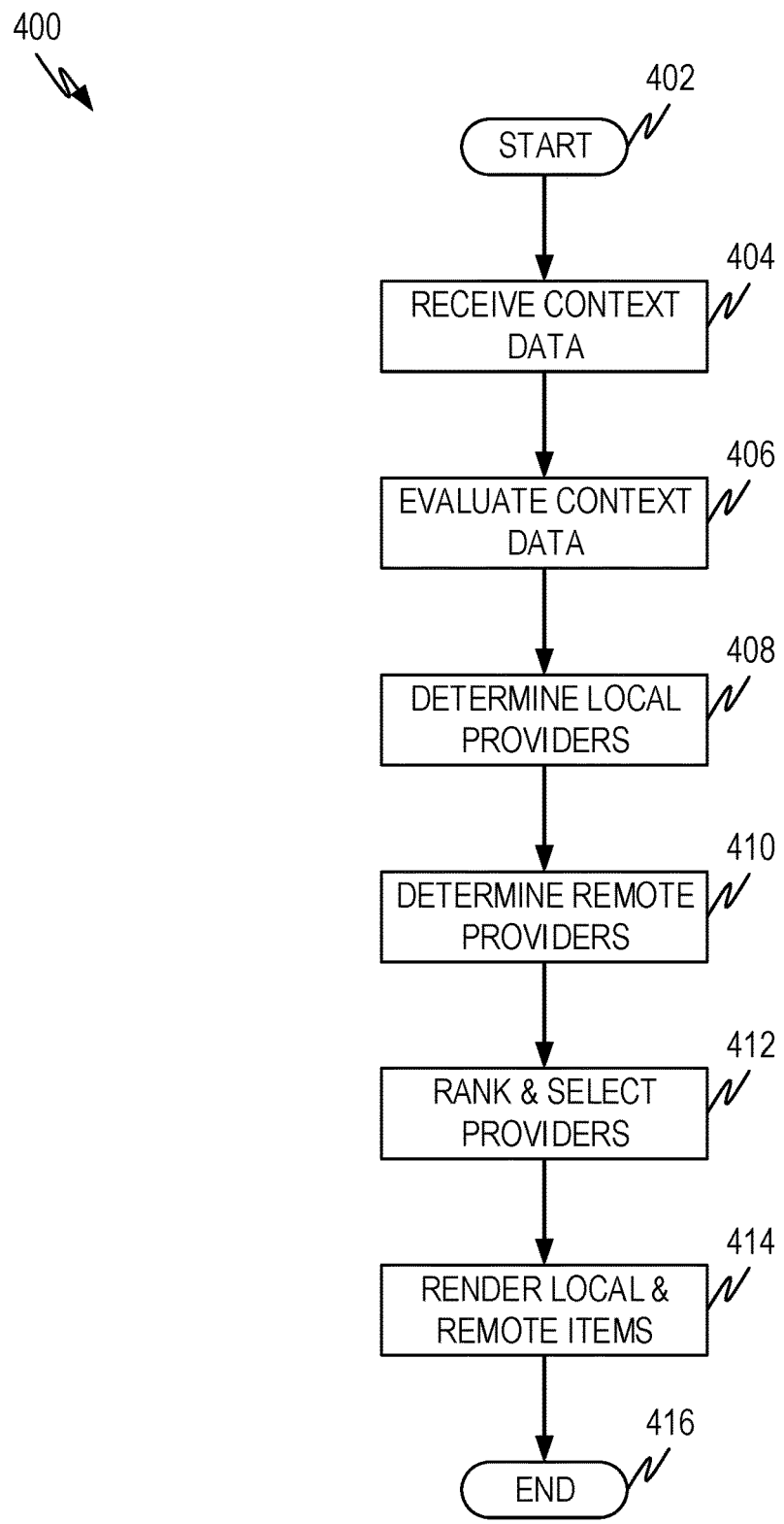
FIG. 4 illustrates a flow diagram according to some aspects of the present disclosure.

FIG. 4 illustrates a flow diagram, shown generally as 400, according to some aspects of the present disclosure. The flow diagram illustrates a method to create a context menu in response to a user invoking a context menu as described herein. Not all the operations need be performed, or performed in the order illustrated, except where logic requires a particular order to operations (e.g., data cannot be evaluated before being received).

The methods starts at operation 402 and proceeds to operation 404. Operation 404 receives context data, such as context data 302 previously described.

Operation 406 is performed in some embodiments where the context data is evaluated as part of the process to select a subset (all or less than all) of the context menu item providers (local or remote) that will be considered for selection. In some instances, this may mean selecting all known context menu item providers for consideration. In other instances, this may mean selecting one or more categories of context menu item providers for consideration. For example, if context menu item providers are broken into categories, one or more categories can be selected for consideration based on the context data. In a more specific example, when the context data indicates a particular object type or category has been selected by the user, operation 406 can select context menu providers that operate on the same object type or category. Finally, for remote context menu item providers, if a particular set of providers are not accessible due to the absence of a communication link or other reason, these context menu items may be eliminated from consideration in some embodiments.

Operation 408 identifies a rank associated with each local provider in the subset determined by operation 406. This can be accomplished, for example, either by calculating a rank for a local context menu item provider based on previously provided information as discussed above, or by sending a request to a local context menu item provider that includes the context data and receiving in return, a rank.

Operation 410 identifies a rank associated with each remote provider in the subset determined by operation 406. This can be accomplished, for example, either by calculating a rank for a remote context menu item provider based on previously provided information as discussed above, or by sending a request to a remote context menu item provider that includes the context data and receiving in return, a rank. Remote context menu item providers can be cached locally, be accessed remotely, or any combination thereof.

Operation 412 considers the ranks of all the context menu item providers in the subset and selects a number that will be used for the context menu. Since each context menu item provider has an associated rank indicating the relevance of the corresponding context menu item provider to the context data, a comparison of the ranks can allow a list of context menu items to be ordered by relevance. There are numerous ways that the context menu items can be selected based on the rank. Some examples include, but are not limited to:

- Place the ranks in rank order and select the top N providers, where N is selected either based on a fixed number (e.g., less than or equal to the fixed number), is selected based on the area available to display the context menu, and/or any combinations thereof.
- Place local context menu item providers in rank order and place remote context menu item providers in rank order. Then select I local menu item providers from the local list and J remote item providers from the remote list. I and J can be selected based on a fixed number where I and J are separate fixed numbers that I and J cannot exceed, can be selected based on a total number (e.g., I+J<=M, with the total selected on the strategies of selecting N), can be selected based on the area available to display the context menu, and/or any combination thereof.
- Any other desired strategy to select a number of context menu item providers from the subset.

Operation 412 can additionally, or alternatively, invoke one or more context menu item providers without the user selecting a context menu item. This was discussed above in conjunction with FIG. 3.

Operation 414 renders the subset of context menu items that correspond to the subset of context menu item providers that were selected by operation 412 and/or the results from one or more invoked context menu item providers. As noted above, each context menu item provider can provide HTML or other rendering code that can be rendered to produce the corresponding context menu item and access the functionality that implements the context menu item. Additionally, or alternatively, invoked context menu item providers can provide HTML or rendering code for the results produced by the invocation. The rendering code can thus be combined and rendered by an appropriate renderer to produce the context menu and/or the results of the invocation. In some embodiments, the ordering of the context menu items is determined at least in part by the ranks associated with the context menu items.

The method ends at operation 416.

Figure 5:
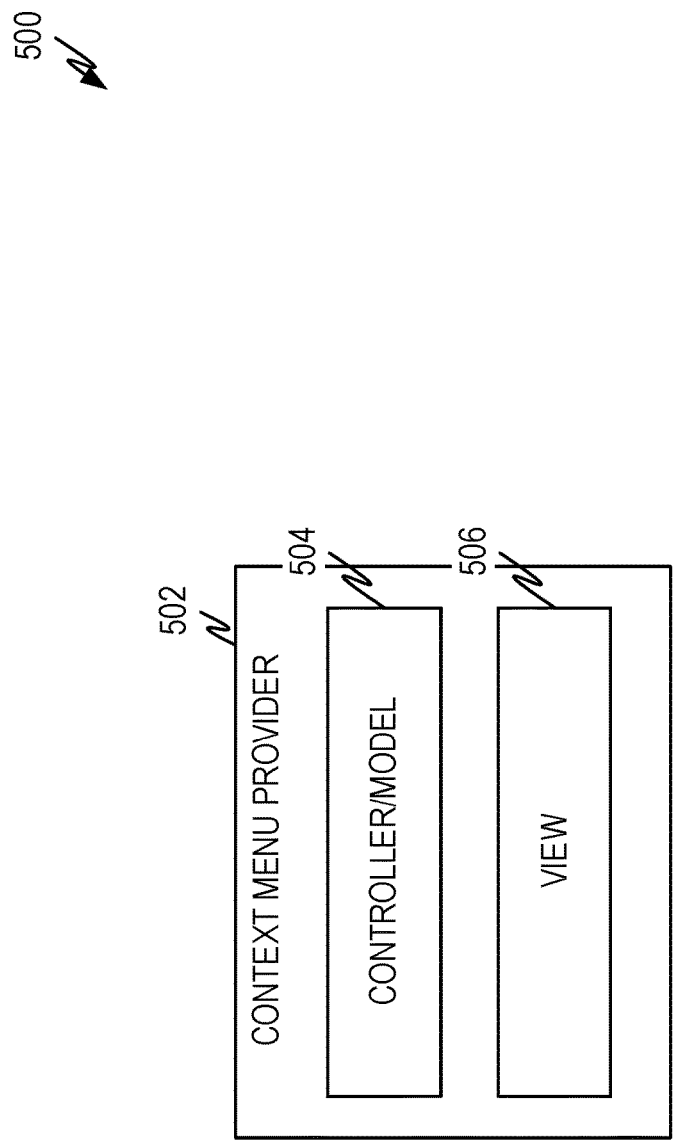
FIG. 5 illustrates an example context menu provider according to some aspects of the present disclosure.

FIG. 5 illustrates an example context menu provider, shown generally as 500, according to some aspects of the present disclosure. The context menu item provider is an object that provides functions associated with a context menu item. The structure may be the same for local context menu item providers, remote context menu items that have been cached locally, and/or remote context menu item providers accessed remotely (e.g., as part of the context menu service). Additionally, or alternatively, the remote context menu item providers accessed remotely can be implemented differently.

The context menu item provider 502 comprises a controller and model 504 and a view 506. One function of the controller and model 504 receive a request that includes context data and returns a rank that indicates relevance of the context menu item provided by the provider to the context data.

Relevance of the context menu item to the context data can be accomplished in several ways. In one example implementation, the controller/model 504 evaluates the context data and ascertains whether the context menu provider matches the type of object (text, data, table, figure, photo, image, and so forth) indicated by the context meu. If there is a match, the controller/model 504 returns a rank indicating high relevance. If there is not a match, the controller/model 504 returns a rank indicating low or no relevance.

Another alternative is to use a trained machine learning model. In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring inferred profile updates.

In some embodiments, example machine-learning algorithms provide a rank (e.g., score from 1 to 100, relevant/not relevant, and so forth) to specify relevance of the corresponding context menu item to the context data. The machine-learning algorithms utilize the training data to find correlations among features of the context data that indicate relevance of the context menu item to the context data.

The training data can be annotated to indicate relevance of the training data examples to the context menu item. In other embodiments, machine-learning models can be trained using unannotated data. The machine-learning training process appraises the relevance of the context menu item as it correlates to the training data. The result of the training is the trained machine-learning model that can be used in controller/model 504. The machine learning models and training methodologies are known and need not be discussed further. With the above description, one of skill in the art will understand how to train a suitable model that can produce a rank in response to context data.

In some embodiments controller and/or model 504 also provides access to the functionality that implements the context menu item. For example, if the context menu item was copy, the controller/model of the corresponding local context menu item provider can call the local functionality that results in a copy of the selected object(s) to a clipboard where they can be accessed at a later time. As another example, if the context menu item was an "auto caption" item that evaluated an image and produced a caption describing the content of the image, the controller/model of the corresponding remote context menu item provider can call the remote functionality that analyzes the image and returns an appropriate caption.

The view 506 comprises HTML or other rendering code that, when rendered, produces the corresponding context menu item and access the provider when the context menu item is selected. As noted herein, the context menu provider 502 can return the view 506 in response to a request.

Figure 6:
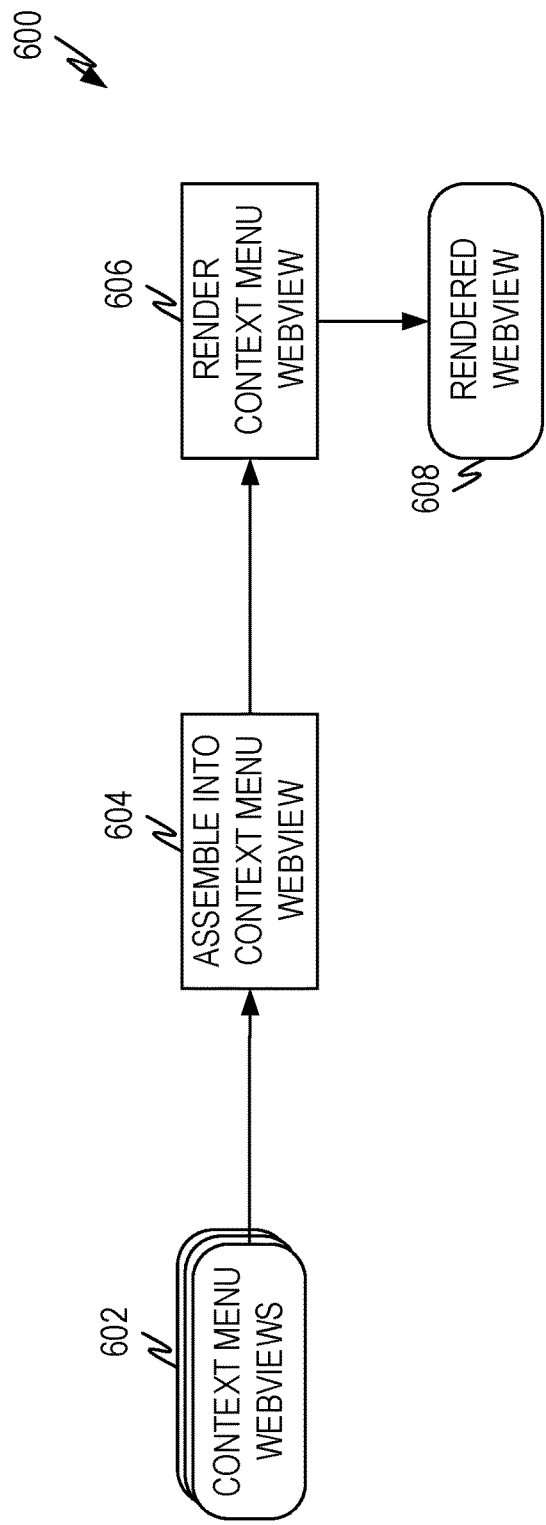
FIG. 6 illustrates an architecture diagram according to some aspects of the present disclosure.

FIG. 6 illustrates an architecture diagram, shown generally as 600, according to some aspects of the present disclosure. The diagram illustrates an example of how multiple context menu views can be assembled into a context menu. Thus, FIG. 6 is an example of how context menu renderer 314 might be implemented in some embodiments.

As noted herein, upon request, context menu item providers can provide a view comprising HTML and/or other rendering code that can be rendered in order to create a rendered context menu item as part of a context menu. Thus, context menu views 602 represent the views from the context menu item providers that have been selected as part of the context menu, as described herein. Because a view is HTML and/or other rendering code, it can produce a rich content menu item when rendered. Thus, menu items are not limited to text. Additionally, menu items can be visually changed based on context data or other information and thus do not need to be static. Furthermore, menu items can be modified visually by modifying the view returned by a context menu item provider. Such can be useful, for example, to test how users respond to different presentations of context menu items. This is particularly useful for remote context menu item providers. The context menu service can return different views to different groups of users for the same context menu item and compare how users respond to the different views. In this way, context menus can become more useful without changing anything in the client application (e.g., office productivity application, or other application incorporating the principles disclosed herein).

In operation 604 the views 602 are assembled into a single view comprising the HTML and/or other rendering code from the views 602. The single view defines how the resultant context menu will look when rendered. Again, because the single view is comprised of HTML and/or other rendering code, the context menu is not limited to text but can comprise any type of information and any formatting that can be produced by the HTML and/or other rendering code. Thus, a rich context menu can be produced that is visually helpful to the users when identifying the functionality that can be accessed through the context menu. In this context visually helpful means to present content in a way that a user can understand and/or visualize what will happen if a particular context menu item is selected.

Operation 606 renders the single view using technology that can render the HTML and/or other rendering code of the single view. Rendering HTML and/or other rendering code is a known operation and need not be discussed further. Several rendering engines are known and any such can be used. Furthermore, the rendering engine may be tailored to the particular set of HTML and/or other rendering code used in the views/single view. HTML and/or other rendering code that will never appear in the views/single view need not be part of the rendering engine used in operation 606 if desired.

The result is a rendered context menu 608. The context menu can be rendered in any appropriate location in the application window, such as in proximity to a selected object, in proximity to the pointer/cursor, in a side panel, and so forth.

Figure 7:
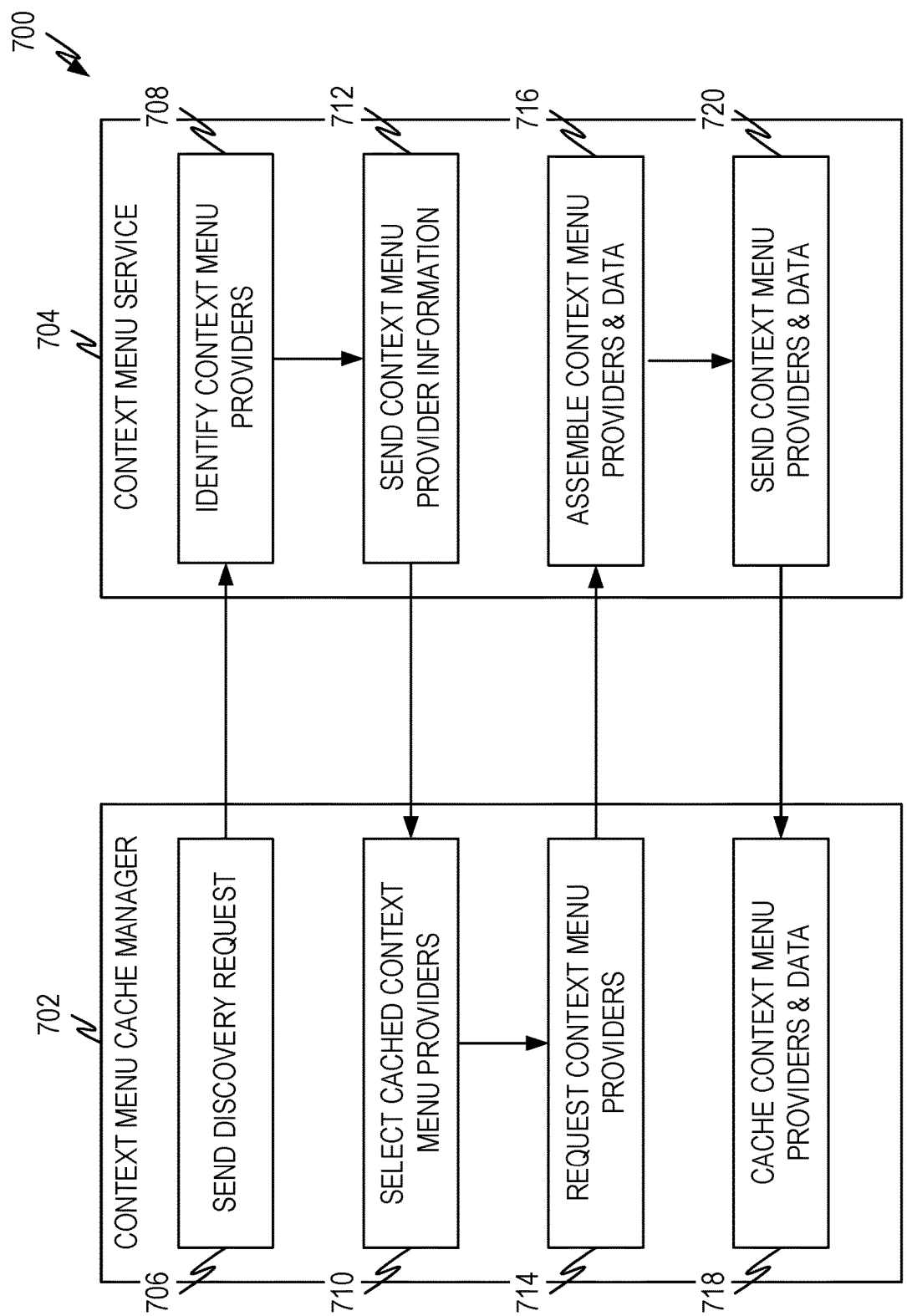
FIG. 7 illustrates a flow diagram according to some aspects of the present disclosure.

FIG. 7 illustrates a flow diagram, shown generally as 700, according to some aspects of the present disclosure. The diagram illustrates a discovery process that can be used with a context menu service to discover remote context menu item providers available through a context menu service and/or request remote context menu item providers for caching locally.

Operation 706 the client machine sends a discovery request to the context menu service 704. In some embodiments, the discovery request is sent by a context menu cache manager 702 or another component. For purposes of discussion, the example of a context menu cache manager 702 will be utilized, although any other mechanism or component can perform the outlined operations.

The context menu service 704 receives the discovery request and identifies remote context menu item providers in operation 708. The remote context menu item providers identified in operation 708 are those context menu providers available to the application.

In operation 712 the context menu service 704 sends information that identifies the list of remote context menu item providers from operation 708 to the context menu cache manager 702 on the client machine.

Rather than the context menu cache manager 702 sending a discovery request to the context menu service 704, as remote context menu item providers are added to the context menu service and made available, the context menu service 704 can register them with the context menu cache manager 702 or other registry available to the application.

The context menu cache manager 702 receives the list of remote context menu item providers. In some instances, the context menu cache manager can decide to cache one or more of the remote context menu item providers in the list. Such a decision can be made, for example, on anticipated use of a remote context menu item provider. For example, the cache manager 702 can evaluate which remote context menu item providers are used most often and can decide that those should be cached locally to have them available when a connection to the context menu service 704 is unavailable. Additionally, or alternatively, the cache manager 702 can evaluate the document or other information to identify which, if any, remote context menu item providers should be cached. For example, if a document has no images, or if an application has no ability to add images to a document, caching remote context menu item providers that deal in images would not be a productive decision. Contrarywise, caching remote context menu items that deal with the most common object type (e.g., text for a word processing document) may be a very productive decision.

Once the remote context menu item providers to be cached are selected in operation 710, operation 714 sends a request to the context menu service 704 for the selected remote context menu item providers.

The context menu service 704 receives the request, assembles the requested remote context menu item providers and/or associated data (operation 716) and returns the remote context menu item providers and/or associated data to the application (operation 720).

The cache manager 702 receives the requested remote context menu item providers and/or associated data and places them in the appropriate cache (operation 718).

Because the context menu service, such as context menu service 216, can implement a variety of different functions in the form of context menu item providers, the operation and functioning of applications (e.g., application 102) and the capability provided by a context menu, can be modified without any changes to the functioning of the application itself. For example, if an office productivity application that allows users to create and edit presentations includes the ability to incorporate graphics into the provision, functionality to manipulate such graphics can be added (or removed) from the application without changing the application.

To illustrate this capability, consider two separate scenarios. In the absence of remote context menu item providers, if a developer desired to implement a new image processing technique into the application that users can access, the application would need to be modified to incorporate the new image processing technique, add new context menu items to access the image processing technique, and ship new versions of the application to users.

However, an application that utilizes remote context menu item providers can add the new image processing technique without modifying the operation of the application. In this scenario, the developer deploys a new remote context menu item provider to the context menu service. The application discovers the newly deployed provider using a process such as those disclosed herein. Then, when a context menu is built for a context where the newly deployed provider is relevant, the context menu item for the new image processing technique will appear in the context menu and the user need only select it to access the newly added technique.

Although the description herein describes the functionality in terms of context menus, similar functionality can be used to implement non-context menus and menu items, a ribbon or other such "quick access" control bars, and so forth.

Figure 8:
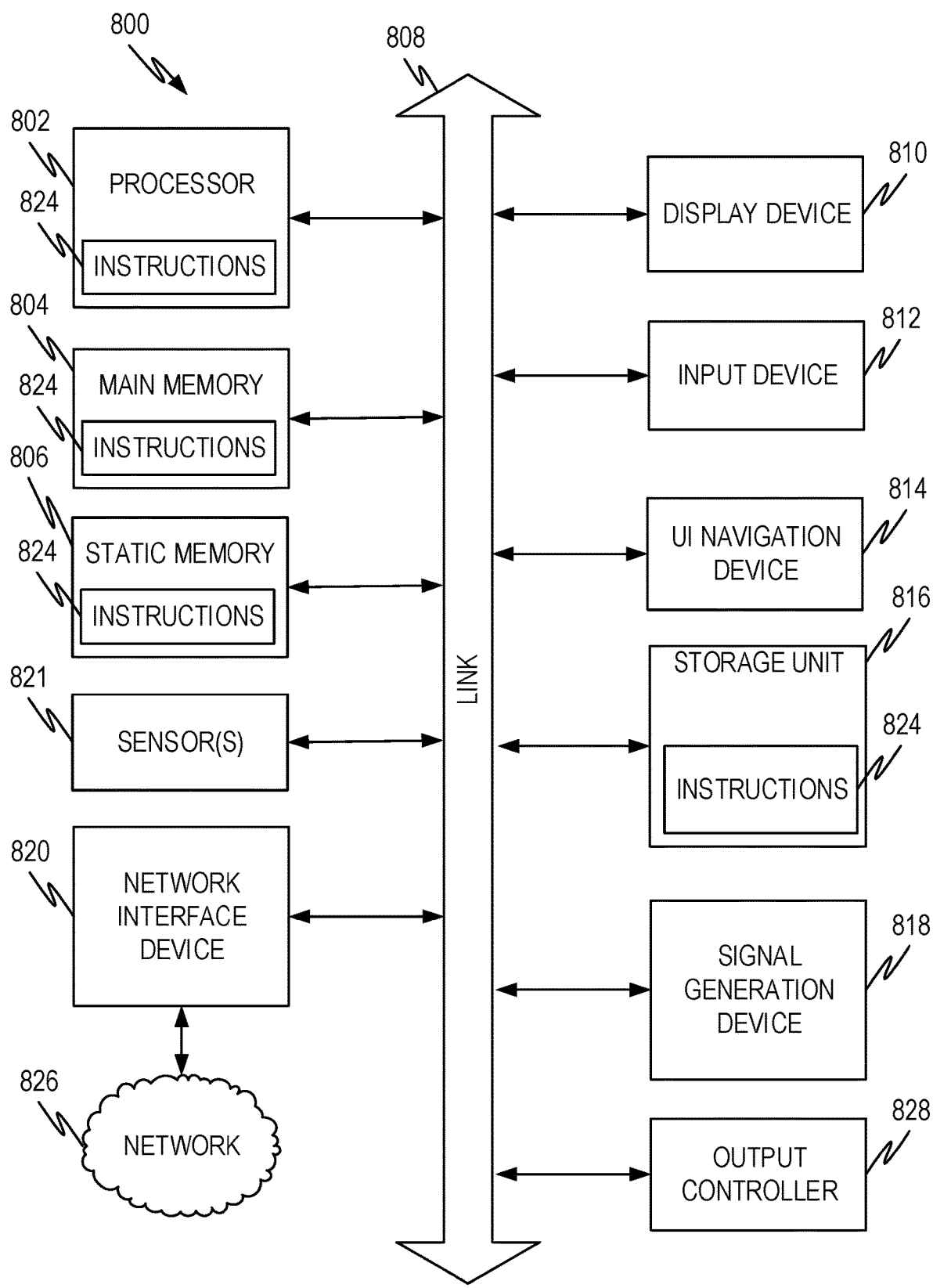
FIG. 8 illustrates a representative architecture for implementing the systems and other aspects disclosed herein or for executing the methods disclosed herein.

FIG. 8 illustrates a representative architecture for implementing the systems and other aspects disclosed herein or for executing the methods disclosed herein.

Example Machine Architecture and Machine-Readable Medium

FIG. 8 illustrates a representative machine architecture suitable for implementing the systems and so forth or for executing the methods disclosed herein. The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless) to connect to and/or communicate over one or more networks 826.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1. A method for in-application search, comprising:

receiving indication of a context menu invocation along with associated context;

determining a set of local context menu item providers each having an associated rank;

determining a set of remote context menu item providers each having an associated rank;

selecting a subset of context menu item providers from a combined set of local context menu item providers and remote context menu item providers based on the ranks; and presenting a context menu comprising items from the subset of context menu item providers to a user.

Example 2. The method of example 1 further comprising:
ordering the items from the subset of context menu item providers according to a rank associated with each item.

Example 3. The method of example 1 or 2 wherein the subset of context menu item providers comprises a local context menu item provider and a remote context menu item provider.

Example 4. The method of example 3 further comprising:
caching the remote context menu item provider locally.

Example 5. The method of example 1, 2, 3, or 4 further comprising:
sending a request to a remote context menu service requesting information regarding context menu item providers at the remote context menu service;
receiving information identifying a plurality of remote context menu item providers at the remote context menu service; and
wherein the set of remote context menu item providers comprises a remote context menu item provider at the remote context menu service.

Example 6. The method of example 1, 2, 3, 4, or 5 wherein:
determining the set of local context menu item providers comprises:
requesting a rank and rendering code from each local context menu item provider; and
receiving a rank and rendering code from each local context menu item provider; and
determining the set of remote context menu item providers comprises:
requesting a rank and rendering code from each remote context menu item provider; and
receiving a rank and rendering code from each remote context menu item provider.

Example 7. The method of example 6 further comprising:
combining rendering code received from the subset of context menu item providers; and
rendering the combined rendering code to produce the context menu.

Example 8. The method of example 6 wherein the rendering code is HTML code and wherein the rendered HTML code comprises both visual and functional elements.

Example 9. The method of example 1, 2, 3, 4, 5, 6, 7, or 8 wherein each context menu item provider comprises:
a model adapted to return a rank based on a received context; and
rendering code to render a context menu item.

Example 10. The method of example 9 wherein the model comprises a trained machine learning model.

Example 11. The method of example 9 wherein the model does not comprise a trained machine learning model.

Example 12. The method of example 1, 2, 3, 4, 5, 6, 7, 8, 9, 10, or 11 wherein the remote context menu item providers comprise one or more of:
a context menu item provider adapted to translate text from one language to another;
a context menu item adapted to provide a definition of text;
a context menu item adapted to apply photo effects to an image;
a context menu item adapted to identify related entities;
a context menu item adapted to provide a direct answer; and
a context menu item adapted to fact check text.

Example 13. The method of example 1, 2, 3, 4, 6, 7, 8, 9, 10, 11, or 12 further comprising:
receiving a registration request from a context menu service, the registration request comprising a remote context menu item provider.

Example 14. An apparatus comprising means to perform a method as in any preceding example.

Example 15. Machine-readable storage including machine-readable instructions, when executed, to implement a method or realize an apparatus as in any preceding example.

Example 16. A method for in-application search, comprising:
receiving indication of a context menu invocation along with associated context;
determining a set of local context menu item providers each having an associated rank;
determining a set of remote context menu item providers each having an associated rank;
selecting a subset of context menu item providers from a combined set of local context menu item providers and remote context menu item providers based on the ranks; and
presenting a context menu comprising items from the subset of context menu item providers to a user.

Example 17. The method of example 16 further comprising:
ordering the items from the subset of context menu item providers according to a rank associated with each item.

Example 18. The method of example 16 wherein the subset of context menu item providers comprises a local context menu item provider and a remote context menu item provider.

Example 19. The method of example 18 further comprising:
caching the remote context menu item provider locally.

Example 20. The method of example 16 further comprising:
sending a request to a remote context menu service requesting information regarding context menu item providers at the remote context menu service;
receiving information identifying a plurality of remote context menu item providers at the remote context menu service; and
wherein the set of remote context menu item providers comprises a remote context menu item provider at the remote context menu service.

Example 21. The method of example 16 wherein:
determining the set of local context menu item providers comprises:
requesting a rank and rendering code from each local context menu item provider; and
receiving a rank and rendering code from each local context menu item provider; and
determining the set of remote context menu item providers comprises:
requesting a rank and rendering code from each remote context menu item provider; and
receiving a rank and rendering code from each remote context menu item provider.

Example 22. The method of example 21 further comprising:
combining rendering code received from the subset of context menu item providers; and
rendering the combined rendering code to produce the context menu.

Example 23. The method of example 21 wherein the rendering code is HTML code and wherein the rendered HTML code comprises both visual and functional elements.

Example 24. The method of example 16 wherein each context menu item provider comprises:
a model adapted to return a rank based on a received context; and
rendering code to render a context menu item.

Example 25. The method of example 16 wherein the remote context menu item providers comprise one or more of:
a context menu item provider adapted to translate text from one language to another;
a context menu item adapted to provide a definition of text;
a context menu item adapted to apply photo effects to an image;
a context menu item adapted to identify related entities;
a context menu item adapted to provide a direct answer; and
a context menu item adapted to fact check text.

Example 26. A system comprising a hardware processor and computer executable instructions, that when executed by the hardware processor, cause the system to perform operations comprising:
receiving indication of a context menu invocation along with associated context;
determining a set of local context menu item providers each having an associated rank;
determining a set of remote context menu item providers each having an associated rank;
selecting a subset of context menu item providers from a combined set of local context menu item providers and remote context menu item providers based on the ranks; and
presenting a context menu comprising items from the subset of context menu item providers to a user.

Example 27. The system of example 26 further comprising:
ordering the items from the subset of context menu item providers according to a rank associated with each item.

Example 28. The system of example 26 wherein the subset of context menu item providers comprises a local context menu item provider and a remote context menu item provider.

Example 29. The system of example 28 further comprising:
caching the remote context menu item provider locally.

Example 30. The system of example 26 further comprising:
sending a request to a remote context menu service requesting information regarding context menu item providers at the remote context menu service;
receiving information identifying a plurality of remote context menu item providers at the remote context menu service; and
wherein the set of remote context menu item providers comprises a remote context menu item provider at the remote context menu service.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method performed by a computing device that is executing a computer-implemented application, the method comprising:
displaying, by way of a graphical user interface (GUI) of the computer-implemented application, an item;
receiving an indication that a user of the computer-implemented application has requested a context menu with respect to the item;
in response to receipt of the indication and based upon the item, identifying a local context menu item provider, wherein the local context menu provider corresponds to first functionality that is performable by the computer-implemented application with respect to the item, and further wherein the local context menu item provider has a first rank with respect to the item;
in response to receipt of the indication and based upon the item, identifying a remote context menu item provider, wherein the remote context menu provider corresponds to second functionality that is performable by a second computer-implemented application with respect to the item, wherein the second computer-implemented application is external to the computer-implemented application, and further wherein the remote context menu item provider has a second rank with respect to the item;
selecting the local context menu item provider and the remote context menu item provider for inclusion in the context menu with respect to the item, wherein the local context menu item provider and the remote context menu item provider are selected based on the first rank and the second rank; and
based upon the local context menu item provider and the remote context menu item provider being selected, presenting the context menu to the user, the context menu comprises a first menu item provided by the local context menu item provider and a second menu item provided by the remote context menu item provider.

2. The method of claim 1 further comprising:
ordering the first menu item relative to the second menu item based upon the first rank and the second rank.

3. The method of claim 1, further comprising identifying a plurality of remote context menu items in response to receipt of the indication and based upon the item, wherein the plurality of remote context menu items have a respective plurality of ranks assigned thereto with respect to the item, and further the remote context menu item provider is selected based upon the plurality of ranks.

4. The method of claim 1 further comprising:
caching the remote context menu item provider locally.

5. The method of claim 1 further comprising:
sending a request to a remote context menu service requesting information regarding context menu item providers at the remote context menu service; and
receiving information identifying a plurality of remote context menu item providers at the remote context menu service;
wherein the set of remote context menu item providers comprises the remote context menu item provider at the remote context menu service.

6. The method of claim 1 wherein:
identifying the local context menu item provider comprises:
requesting a rank and rendering code from the local context menu item provider; and
receiving the first rank and first rendering code from the local context menu item provider; and identifying the remote context menu item provider comprises:
- requesting a rank and rendering code from the remote context menu item provider; and
- receiving the second rank and second rendering code from the remote context menu item provider.

7. The method of claim 6 further comprising:
combining the first rendering code sand the second rendering code; and
rendering the combined rendering code to produce the context menu.

8. The method of claim 1 further comprising:
selecting a context menu item provider based on its rank;
invoking the selected context menu item provider without user direction;
receiving rendering code describing the results of the invocation; and
rendering the received rendering code.

9. The method of claim 1 wherein the remote context menu item provider comprises:
- a model adapted to return a rank based on a received context; and
- rendering code to render the second context menu.

10. The method of claim 1 wherein the remote context menu item provider is one or more of:
- a context menu item provider adapted to translate text from one language to another;
- a context menu item provider adapted to provide a definition of text;
- a context menu item provider adapted to apply photo effects to an image;
- a context menu item provider adapted to identify related entities;
- a context menu item provider adapted to provide a direct answer; and
- a context menu item provider adapted to fact check text.

11. A system comprising a hardware processor and computer executable instructions, that when executed by the hardware processor, cause the system to perform operations comprising:
- displaying, in a graphical user interface (GUI) of a computer-executable application, an item;
- receiving an indication that a user of the system has requested invocation of a context menu with respect to the item;
- based upon the indication and the item, identifying a local context menu item provider, wherein the local context menu item provider has a first rank assigned thereto, and further wherein the local context menu item provider corresponds to first computer-implemented functionality performable by the computer-executable application with respect to the item;
- based upon the indication and the item, identifying a remote context menu item provider, wherein the remote context menu item provider has a second rank assigned thereto, and further wherein the remote context menu provider corresponds to second computer-implemented functionality performable by a second computer-executable application with respect to the item;
- selecting of the local context menu item provider and the remote context menu item provider based upon the first rank and the second rank; and
- presenting the context menu in the GUI of the computer-implemented application, where the context menu comprises:
  - a first menu item provided by the local context menu item provider; and
  - a second menu item provided by the remote context menu item provider to a user.

12. The system of claim 11, the operations further comprising:
ordering the first menu item relative to the second menu item in the context menu based upon the first rank and the second rank.

13. The system of claim 11, the operations further comprising:
receiving a selection of the second menu item in the context menu; and
in response to receiving the selection of the second menu item, invoking the second computer-executable application.

14. The system of claim 11, the operations further comprising:
caching the remote context menu item provider locally.

15. The system of claim 11, the operations further comprising:
sending a request to a remote context menu service requesting information regarding context menu item providers at the remote context menu service; and
receiving information identifying a plurality of remote context menu item providers at the remote context menu service;
wherein the set of remote context menu item providers comprises the remote context menu item provider at the remote context menu service.

16. The system of claim 11 wherein:
identifying the local context menu item provider comprises:
- requesting a rank and first rendering code from the local context menu item provider; and
- receiving the first rank and the first rendering code from the local context menu item provider; and
identifying the remote context menu item provider comprises:
- requesting a rank and second rendering code from the remote context menu item provider; and
- receiving the rank and the second rendering code from the remote context menu item provider.

17. The system of claim 16, the operations further comprising:
combining the first rendering code and the second rendering code; and
rendering the combined rendering code, wherein the context menu is produced based upon the rendering of the combined rendering code.

18. The system of claim 16 wherein the rendering code is HTML, and wherein the rendered HTML code comprises both visual and functional elements.

19. A computer storage medium comprising executable instructions that, when executed by a processor of a machine, cause the machine to perform operations comprising:
receiving an indication that a user of a computer-executable application has requested invocation of a context menu with respect to an item displayed in a graphical user interface (GUI) of the computer-executable application;
identifying a local context menu item provider based upon the indication and the item, wherein the local context menu item provider corresponds to first functionality performable by the computer-executable application with respect to the item, and further wherein the local context menu item provider has a first rank assigned thereto with respect to the item;

identifying a remote context menu item provider based upon the indication and the item, wherein the remote context menu item provider corresponds to second functionality that is performable by a second computer-executable application with respect to the item, and further wherein the remote context menu item provider has a second rank assigned thereto with respect to the item;

selecting the local context menu item provider and the remote context menu item provider based on the first rank and the second rank;

retrieving first HTML for a local context menu item from the local context menu item provider;

retrieving second HTML for a remote context menu item from the remote context menu item provider;

combining the first HTML and the second HTML;

rendering the combined HTML, wherein the context menu is produced based upon the rendering of the combined HTML; and presenting the context menu in the GUI of the computer-executable application.

20. The computer storage medium of claim 19, the operations further comprising ordering the local context menu item and the remote context menu item based on the first rank and the second rank.

* * * * *